Oct. 9, 1934.  A. E. JURS  1,976,445
VALVE CONTROL SYSTEM
Filed March 25, 1931  5 Sheets-Sheet 1

FIG. 1.

INVENTOR.
Albert E. Jurs
BY White, Prost, Hehr & Lothrop
ATTORNEYS.

FIG_4_

FIG_5_

INVENTOR.
Albert E. Jurs

FIG_6_

FIG_7_

INVENTOR.
Albert E. Jurs

Oct. 9, 1934.    A. E. JURS    1,976,445
VALVE CONTROL SYSTEM
Filed March 25, 1931    5 Sheets-Sheet 5

INVENTOR.
Albert E. Jurs
BY
ATTORNEYS.

Registered Oct. 9, 1934

1,976,445

UNITED STATES PATENT OFFICE 1,976,445

VALVE CONTROL SYSTEM

Albert E. Jurs, Piedmont, Calif., assignor to Shand & Jurs Company, Berkeley, Calif., a co-partnership consisting of Reginald C. Shand and Albert E. Jurs Application March 25, 1931, Serial No. 525,152

24 Claims. (Cl. 137—144)

This invention relates generally to systems for effecting operation of valve units from a remote point, and is of particular value as applied to tank trucks or cars, for controlling the dispensing of inflammable liquids such as gasoline.

It is a general object of the invention to devise a system of the above character which will enable a greater latitude of selection and control of the valve units to be operated. For example my invention is characterized by the fact that an operator may simultaneously operate a plurality of valve units from a single source of fluid pressure, or by properly setting certain control members, individual valve units can be operated to the exclusion of other units, or selected groups of units can be operated.

It is a further object of the invention to devise an improved hydraulic actuator for use in operating a plurality of valve units, and which will enable proper operation of a variable number of valve units for a given increment of movement of an operating member.

It is a further object of the invention to devise a novel type of selective distributing means which can be manually controlled for selectively applying fluid pressure to a plurality of fluid pressure operated valve units.

It is a further object of the invention to devise an improved valve unit adapted to be operated by hydraulic pressure, and which has provision for the removal of trapped air.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings.

Figure 1:
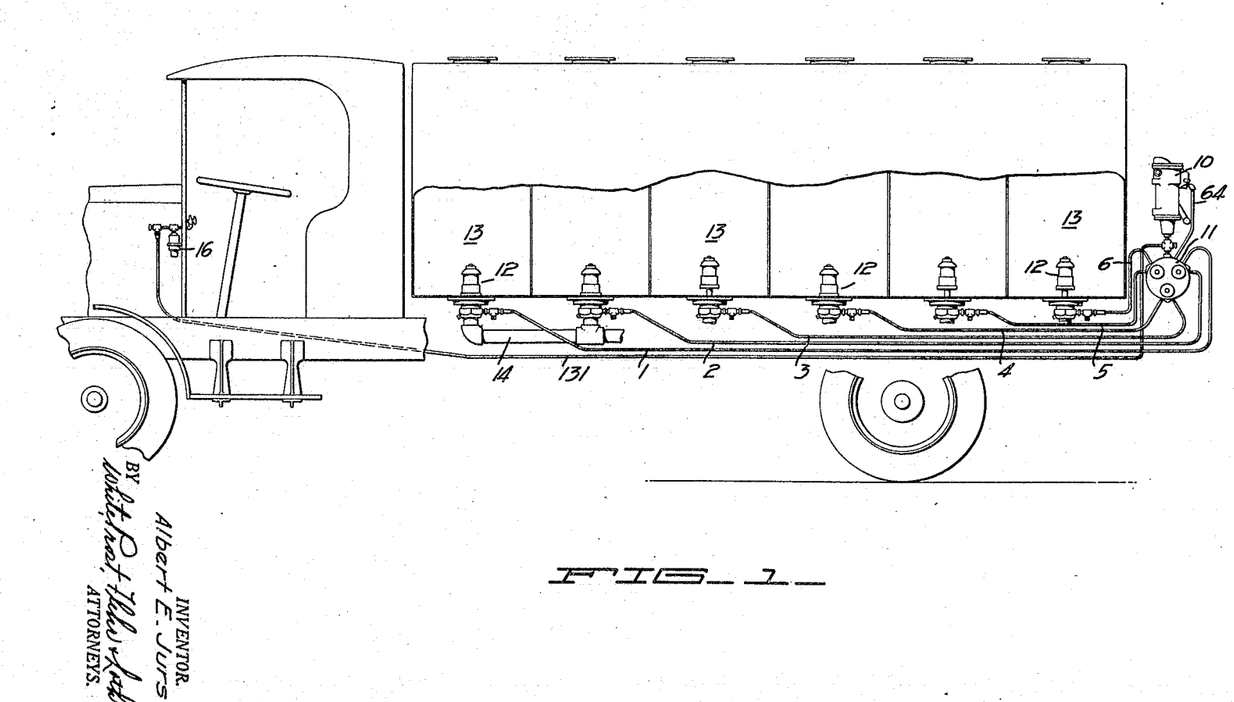
Figure 1 is a side elevational view, partly in cross section, illustrating a system corresponding to my invention applied to a tank truck.

Referring first to Fig. 1, the general system of the invention includes a hydraulic actuator 10, selective distribution mechanism 11, and a plurality of individual valve units 12. Valve units 12 are shown associated with the individual compartments 13 of a motor truck tank. Selective distributing mechanism 11 is connected to actuator 10, and also to the individual valve units 12 by hydraulic connections to be presently described. The settings of this mechanism determine the particular valve unit or units to be operated, depending upon the setting, operation of actuator 10 serves to open the particular unit or units selected. Opening of certain valve units permits discharge of liquid from the corresponding compartment 13 thru the discharge conduit or conduits 14. Device 16 illustrated in Fig. 1 is associated with the general hydraulic system, and consists of a pressure operated switch for controlling the ignition system of the truck motor. An arrangement of this character has been disclosed and claimed in copending application No. 355,711 filed April 17, 1929, now Patent No. 1,960,831, of May 29, 1934.

Figures 2, 3:
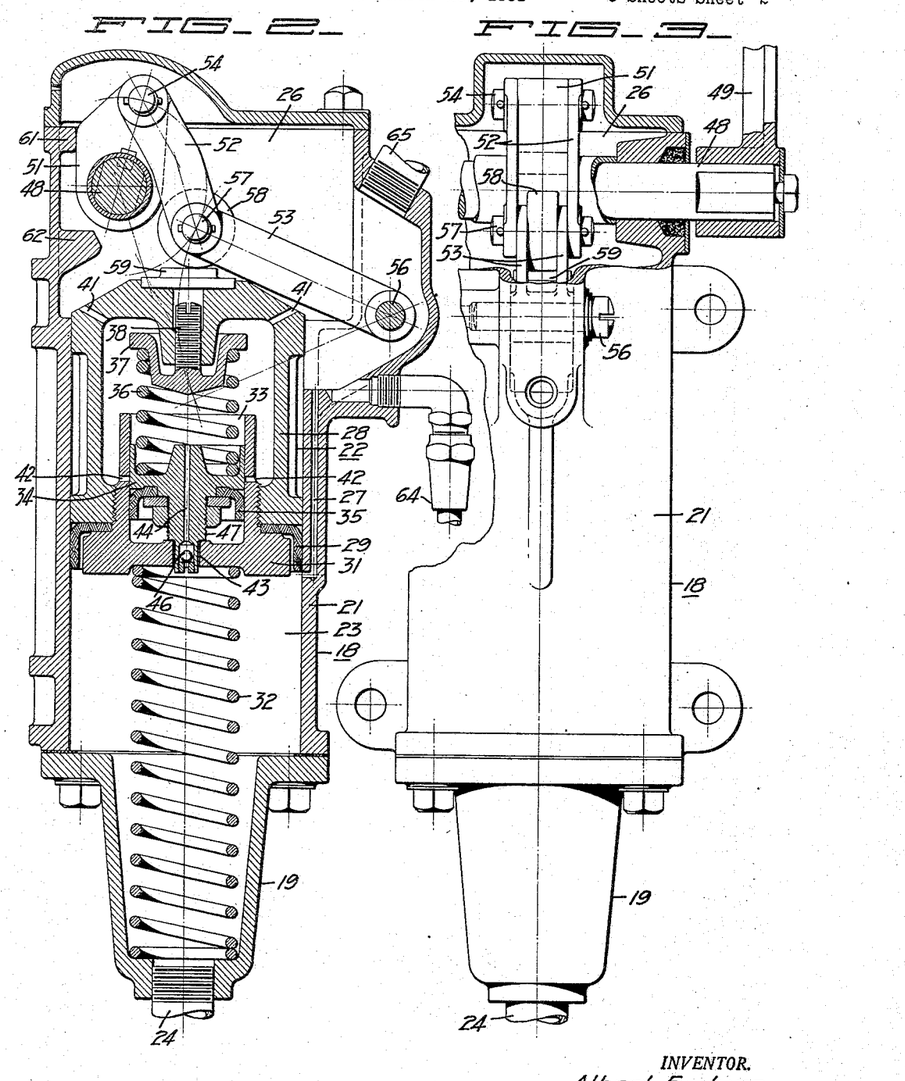
Fig. 2 is a side elevational view in cross section, illustrating the preferred form of hydraulic actuator utilized in my system.
Fig. 3 is an end view, partly in cross section, of the actuator illustrated in Fig. 2.

The details of the hydraulic actuator 10 can be made clear by examination of Figs. 2 and 3. It consists of a casing 18, the lower part 19 of which is made separable. The intermediate portion of the casing is formed to provide an upright cylinder 21, within which a plunger or piston 22 is adapted to reciprocate. That part of the casing 18 below the piston 22, forms together with the piston, a closed liquid chamber which has been designated generally at 23. This chamber is in communication with pipe 24 which forms a part of the hydraulic connections to the several valve units, whereby upon downward movement of piston 22 to displace liquid from chamber 23, liquid under pressure is expelled thru pipe 24 to actuate certain valve units, while upon upward movement of piston 22, liquid flows back thru pipe 24 to chamber 23. In this connection, due to the fact that that portion of the hydraulic system connection to pipe 24 is closed, the system is characterized in that it operates with a surging or pulsation of a mass of confined liquid.

The upper portion 26 of the actuator casing serves to house certain mechanical parts to be presently described, and also serves as an auxiliary liquid reservoir. This reservoir is adapted to have communication with chamber 23 thru port 27, for retracted position of piston 22. As the piston moves downwardly towards actuated or projected position, communication of the auxiliary liquid reservoir with chamber 23 thru port 27 is interrupted.

The piston 22 is preferably of unique construction, and consists of a body portion 28 having a hollow interior. A cup washer 29 is secured to the lower end of body 28, by suitable means such as a threaded fitting 31. In order to continuously urge the piston toward retracted position, a compression spring 32 has its upper end seated upon the lower face of fitting 31, and its lower end seated in the lower casing portion 19.

The maximum displacement of piston 22, when moved from its retracted to its projected position, is such that a sufficient amount of liquid under pressure will be supplied to effect simultaneous actuation of all of the valve units incorporated in the system. Where one or a lesser number than all of the valve units are to be actuated, it is apparent that a somewhat lesser quantity of liquid under pressure is required. Obviously with an ordinary piston type of actuator, such an actuation of one or less than all of the valve units might be effected without building up an undue liquid pressure, simply by moving the piston a lesser amount to displace only the quantity of liquid required. However it is desirable for many reasons to always effect full movement of the piston from retracted to projected positions, irrespective of the number of valves being actuated. This necessitates either a bypassing of a portion of the liquid displaced by the plunger back into the auxiliary reservoir when a lesser number than all of the valves are being operated, or some means in the hydraulic system for accommodating the excess liquid. In the preferred form of my invention I have incorporated means for bypassing a portion of the liquid back to the auxiliary reservoir when a lesser number than all of the valves are being actuated, and this means can be conveniently mounted on piston 22.

Thus referring to Fig. 2 it will be noted that a cylinder 33 is formed as a part of fitting 31, this cylinder being preferably concentric with cylinder 21. A secondary piston 34 is fitted within cylinder 33, and is provided with a suitable cup washer 35. Piston 34 is preferably biased, as by means of a spring, to a lowered position relative to the main portion of the piston 22. Thus for this purpose there is shown a compression spring 36 having its lower end seated upon piston 34. The upper end of spring 36 engages the seating member 37, which is carried by a threaded screw 38. Screw 38 is threaded in body 28 of the main portion of piston 22, and by turning screw 38, tension upon spring 36 can be adjusted. It will be noted that the interior of piston 22 is in communication with the liquid in the auxiliary reservoir formed by casing part 26, thru ports 41, and that ports 42 communicate between the interior of piston 22 thru the side walls of cylinder 33. Likewise that portion of cylinder 33 below secondary piston 34, is in communication with the liquid chamber 23 thru port 43. When secondary piston 34 is in its lowermost position relative to piston 22 as illustrated in Fig. 2, ports 42 are closed. However when secondary piston 34 is raised by virtue of liquid pressure in chamber 23, ports 42 are exposed and liquid is free to bypass from chamber 23, thru ports 43 and 41, back into the auxiliary reservoir.

The functioning of secondary piston 34 will be apparent from the above description. As piston 22 is moved downwardly from retracted to projected position, it is evident that in the event a lesser number than all of the valve units are being actuated, liquid pressure in chamber 23 will build up above a given predetermined maximum value, sufficient to cause secondary piston 34 to move to expose ports 42, thereby enabling liquid to be bypassed from chamber 23 back into the auxiliary reservoir. Thus piston 22 can move completely to projected position without building up such an undue pressure as might cause injury to the valve units being operated or to other portions of the hydraulic pistons, and without requiring undue force for its movement. After piston 22 is in projected position, it will be noted that secondary piston 34 will be in a raised position with respect to piston 22, and therefore secondary piston 34 will form in effect a resilient wall for pressure chamber 23. Thus if a certain amount of leakage should occur from the system while the piston 22 is in projected position, such leakage will not cause an immediate drop in liquid pressure, as the decrease in liquid volume will be accommodated by downward movement of secondary piston 34 under the urge of spring 36. Thus in spite of slight leakage from the system, the valve units actuated can be retained in actuated position for relatively long periods of time, while the piston 22 is in projected position. Likewise it should be noted that the volumetric displacement of piston 22 should be such that even when all of the valve units incorporated in the system are operated simultaneously, secondary piston 34 is moved against the tension of spring 36 to provide a resiliency, for the purposes set forth above.

As has been previously explained when piston 22 moves upwardly from a projected to a retracted position, secondary piston 34 closes ports 42, and therefore additional means should be provided for permitting a flow of liquid from the auxiliary reservoir back into chamber 23, particularly where less than all of the valves have been actuated or if a certain amount of liquid has leaked from the system during the preceding actuation of all of the valve units. For this purpose a port 44 is shown for establishing communication between the interior of the body 28, and the liquid chamber 23. Flow of liquid thru this port is preferably controlled by a check ball 46, which during downward movement of piston 22, is moved into sealing engagement with a cooperating seat 47. Thus during downward movement of piston 22, no liquid can return to the auxiliary reservoir except thru ports 42, while during upward movement of the piston liquid is free to flow from the auxiliary reservoir into chamber 23. This arrangement is also advantageous in that it prevents upward movement of piston 22 under urge of spring 32 from sucking liquid from the valve units, which might cause too rapid closing of the valve units, or seepage of gasoline or other liquid from the tanks into the valve units and the hydraulic system. In the event the main piston returns to its retracted position prior to closing of the valve units being actuated, the valves can continue to move to closed position as liquid in chamber 23 can flow to the auxiliary reservoir thru port 27. The valve units are of course urged toward closed position by their individual springs.

The mechanism for facilitating manual movement of piston 22 from projected position, includes a shaft 48 which is journaled in the upper casing part 26. An operating handle 49 is secured to one end of shaft 48. Within the casing part 26 a lever 51 is fixed to the shaft. Associated with lever 51 are the links 52 and 53. One end of link 52 is connected to arm 51 by pivot pin 54, while one end of link 53 is pivotally connected to the casing part 26 by pivot pin 56. The adjacent ends of links 52 and 53 are pivotally connected together by pin 57 which also carries a roller 58. A plate or disc 59 of hardened metal is mounted upon the upper end of piston body 28, and its upper face is in abutting contact with the periphery of roller 58. Angular movement of lever 51 is limited by stops 61 and 62.

When lever 51 is rotated in a clockwise direction from the position shown in Fig. 2, to a position in which it comes into contact with stop 62, as by applying manual force to lever 49, roller 58 is moved downwardly to force piston 22 to its projected or actuated position. In such position the center of pivot pin 54 has passed dead center position with respect to the line of centers between shaft 48 and pin 57. Therefore the piston 22 will be locked in actuated or projected position, until force is again applied to lever 49 to return it to its initial position. It will be noted that irrespective of the rapidity with which lever 49 is returned to initial position, piston 22 is left free to return to its initial position under the force of spring 32. Therefore the actuator is not apt to be improperly operated by attempts to repeatedly oscillate lever 49 for one operation of the system.

Referring again to Fig. 2 it will be noted that the casing is provided with a pipe connection 64 by means of which liquid can be returned into the auxiliary reservoir. The purpose of this pipe connection will be presently explained. Likewise another pipe connection 65 is shown for facilitating replenishing the liquid in the auxiliary reservoir.

A desirable form of selective distributing means is illustrated in detail in Figs. 6 to 10 inclusive. It consists of a casing formed of a base plate 67, to one side of which a hollow body member 68 is clamped. The interior of the casing forms a fluid chamber 69, which is in communication with the actuator thru pipe 24. The inner face 71 of base plate 67 forms a seating surface for a plurality of rotatable disc valve members 72. To effect rotation of valve members 72, operating stems 73 extend thru the front wall of body member 68, and the inner end of each stem 73 has a driving connection with its corresponding valve member 72. An operating knob 74 is connected to the outer end of each stem 73. Packing gland 76 surrounding each stem 73 prevents leakage of liquid. To facilitate setting of each knob 74, a spring pressed ball detent 77 is provided which engages recesses or pockets 78 formed in the front plate of body member 68. Each valve member 72 is normally urged into seating engagement, by means of a compression spring 79. Base plate 67 is provided with an arrangement of ports, which are in communication with separate pipes or tubes leading to the valve units to be actuated. Thus in Fig. 7 these pipes have been numbered 1 to 6 inclusive. The additional pipe connection 64 connects to the hydraulic actuator as previously explained.

Figure 10:
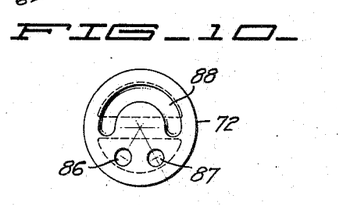
Fig. 10 is a detail illustrating the arrangement of ports in one of the control valve members.

The groups of ports which cooperate with each rotatable valve member 72 are substantially identical, and a description of the arrangement of ports for one valve member will suffice for the others. Thus referring to Figs. 6 and 9, ports 81 and 82 communicate with the seating surface 71, and with two of the pipe connections to separate valve units. Likewise the port 83 communicates with a central pocket 84, which in turn is in communication with pipe connection 64 leading back to the auxiliary reservoir of the actuator. Referring particularly to Fig. 10 each valve member 72 is provided with two spaced ports 86 and 87, and also the inner face of the valve member is provided with an arcuate port or groove 88.

Figure 8:
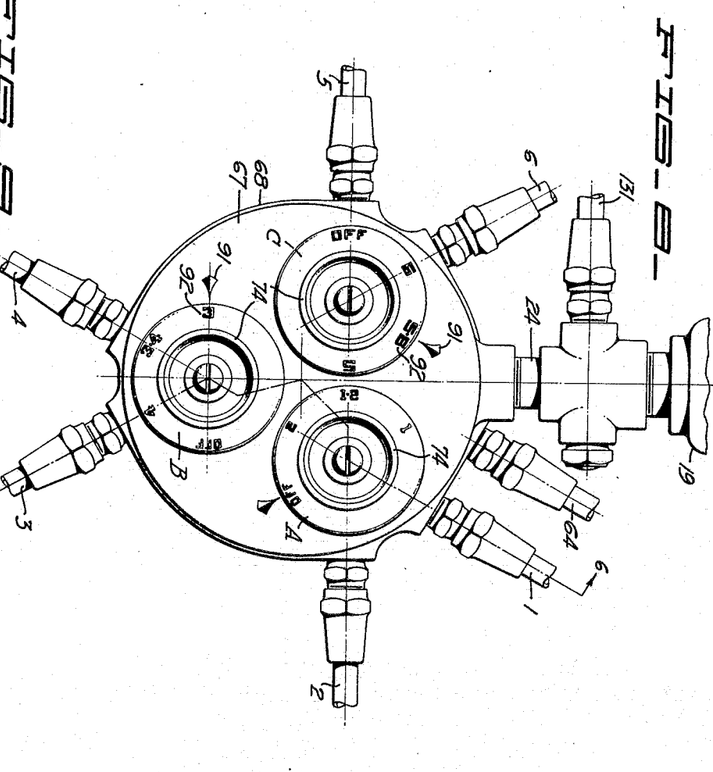
Fig. 8 is a plan view of the mechanism shown in Fig. 6.
Figure 9:
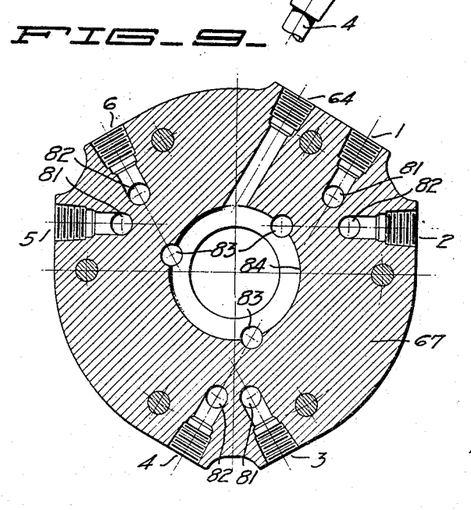
Fig. 9 is a detail taken along the line 9—9 of Fig. 6.

To facilitate explanation of the mode of operation, the parts controlled by the knobs can be considered as separate valve devices, and can be separately designated as A, B, and C as indicated in Fig. 8. To facilitate visually setting these devices A, B and C in different positions, pointers 91 can be provided in conjunction with reference numerals or characters 92 marked upon the faces of knobs 74. Assuming now that the knob of device A is in the "off" position as illustrated in Fig. 8, ports 86 and 87 of this particular device are out of registry with ports 81 and 82, and ports 81 and 82 are in communication with one of ports 83 thru groove 88. Thus pipes 1 and 2 are vented to the auxiliary reservoir thru pipe 64 and cannot be actuated. If the operator now turns the knob of device A to the position marked 2, the corresponding arcuate groove 88 is now in communication with only ports 81 and 83, but port 86 is in registry with port 82. Thus fluid under pressure can be applied to pipe 2 to the exclusion of pipe 1. If the knob of device A is set to the position marked 1—2, then arcuate groove 88 is out of communication with ports 81 and 82 and these ports are in communication with ports 86 and 87 to apply liquid under pressure to both pipes 1 and 2. When in the position marked 1 ports 82 and 83 are in communication thru groove 88, and port 87 establishes communication between chamber 69 and port 81 so that liquid under pressure is applied to the pipe 1. Similarly the knobs of devices B and C can be set to the positions indicated, so that liquid under pressure can be applied to one or both of the pipes of which each of these devices control. Thus it is thus evident that by setting the positions of devices A, B and C, fluid pressure can be supplied to any one of the pipe connections 1 to 6 inclusive, to any two, three, four or five of these pipes, or to all of these pipes simultaneously.

It is characteristic of the selective distributing means described above with reference to Figs. 6 to 10 inclusive, that the selective action is accomplished by varying the setting of a number of members which is substantially less than the total number of valve units to be actuated. Thus in the particular system illustrated six valve units are to be actuated, and selective distribution to these six valve units is accomplished by varying the setting of three control knobs.

Figure 4:
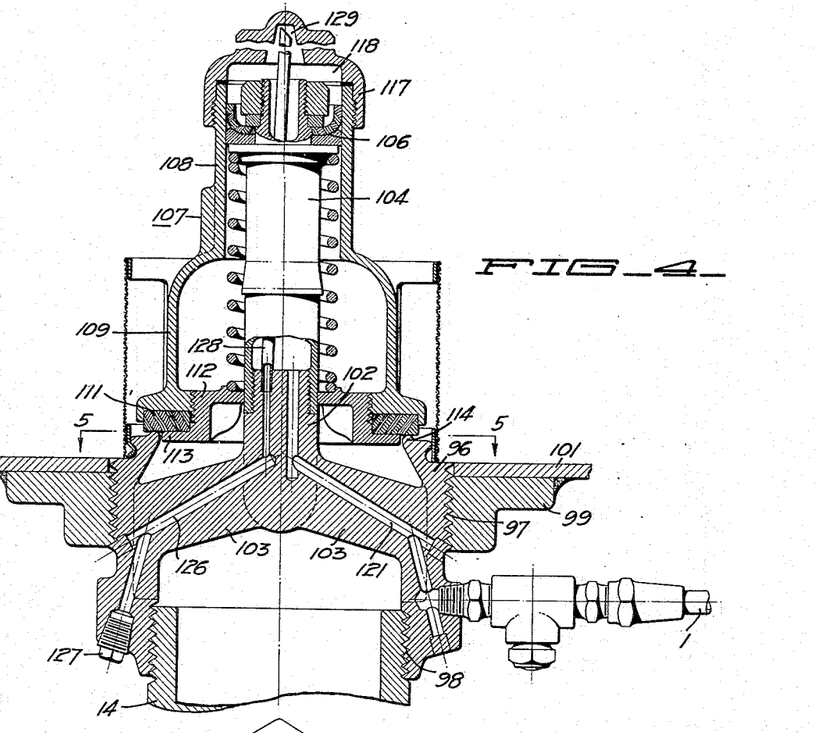
Fig. 4 is a side elevational view, in cross section, illustrating my improved hydraulically operated valve unit.
Figure 5:
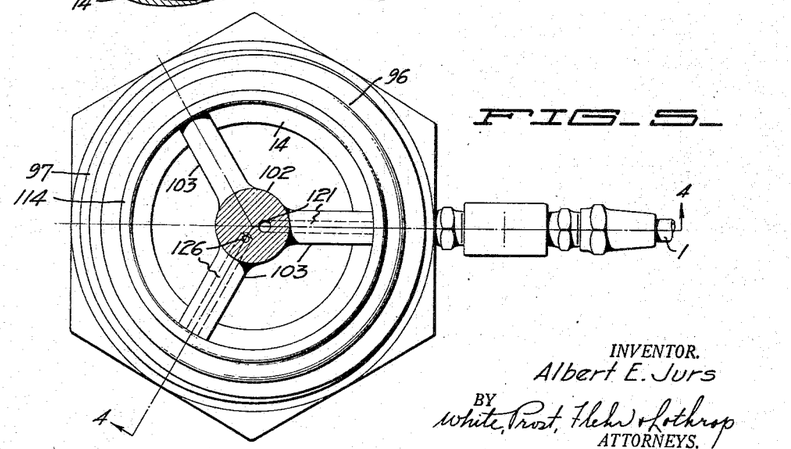
Fig. 5 is a cross sectional detail taken along the line 5—5 of Fig. 4.
Figure 6:
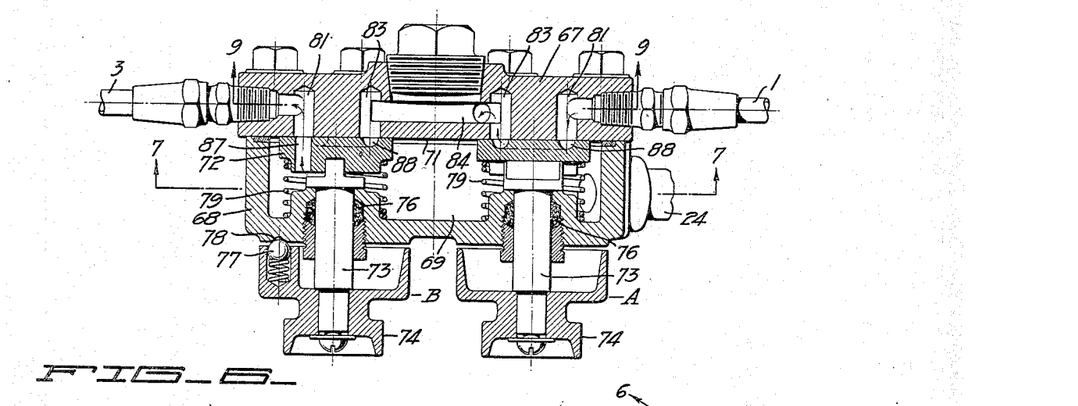
Fig. 6 is a side elevational view, in cross section, illustrating the selective distributing mechanism utilized in my system.
Figure 7:
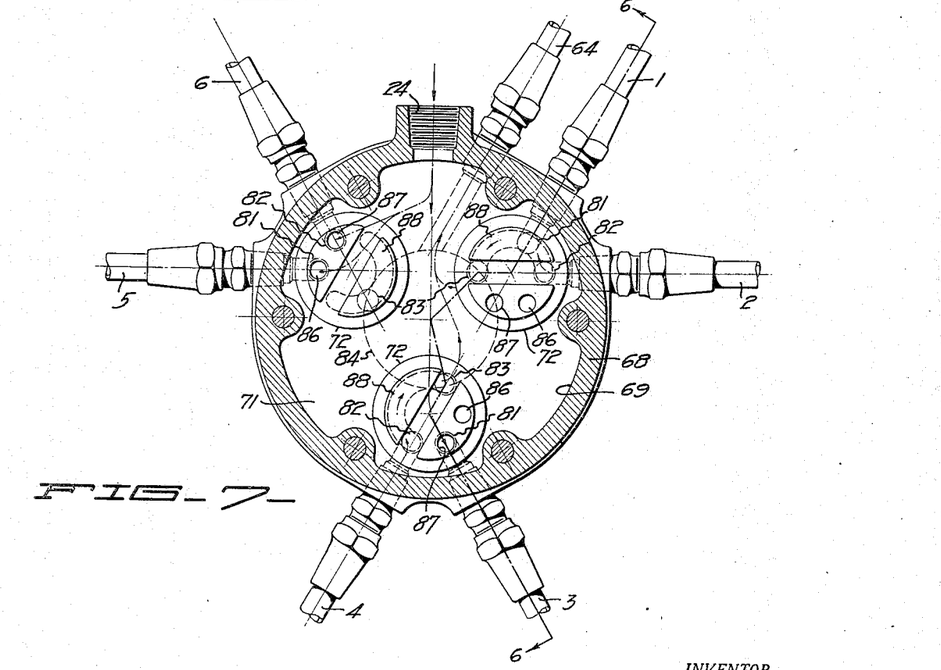
Fig. 7 is a cross sectional view taken along the line 7—7 of Fig. 6.

A suitable type of valve unit which can be utilized in my system is illustrated in Figs. 4 and 5. This valve unit consists of a hollow body 96, having an externally threaded portion 97, and an internally threaded portion 98 for making connection with the liquid discharge conduit 14. Threaded portion 97 is adapted to engage a flange 99, this flange being welded or otherwise secured to the bottom wall 101 of a tank or tank compartment. The body 96 also includes the inner upstanding member 102, which is secured to the remainder of the body by the radial arms 103. An upstanding tube like member 104 is secured to portion 102, and is provided with a cup washer at its upper end to form a piston 106. Surrounding tube like member 104 there is a movable shell 107, one portion 108 of which forms a cylinder fitted about piston 106, and the lower portion 109 of which is enlarged or bell shaped to form a movable valve member. An annular seating ring 111 is secured to the lower edge of portion 109, and is held in operative position by a nut 112 provided with retaining shoulder 113. Nut 112 is guided upon the lower portion of tube like member 104, and seating ring 111 cooperates with a relatively stationary annular seat 114 formed upon the valve body 96. A compression spring 116 has its upper end seated upon piston 106 and its lower end seated upon the upper face of nut 112. Therefore member 107 is normally biased toward closed position, that is to urge ring 111 into sealing engagement with valve seat 114. A closure cap 117 is mounted upon the upper end of the cylinder forming portion 108, so that a closed liquid chamber 118 is formed above piston 106.

In order to enable introduction of liquid under pressure into chamber 118, a pipe connection, which in this case is represented as pipe 1, is attached to the body 96 as illustrated in Fig. 4. Duct 121 formed within the body, communicates between pipe connection 1 and the interior of tube like member 104. Therefore upon application of liquid pressure thru pipe connection 1, liquid flows thru duct 121 upwardly into tube-like member 104 into chamber 118, to lift shell 107 and thus open the valve. When the liquid is permitted to exhaust back thru pipe 1 the valve is automatically closed by the bias afforded by the spring 116.

When the system is initially put into operation, or during operation, it may happen that a certain amount of air becomes trapped in chamber 118. To enable venting of such trapped air whenever desired, body 96 is shown provided with another duct 126 which is normally closed by suitable means such as a threaded plug 127. The inner end of plug 127 communicates with a tube 128, the upper end of this tube terminating in a pocket 129 formed in closure 117. Any air trapped in chamber 118 will of course accumulate in pocket 129, and by removing plug 127, the trapped air can be exhausted to the atmosphere.

A valve unit such as described above is characterized by the fact that a definite quantity of liquid under pressure must be introduced into chamber 118 by way of pipe 1, in order to completely open the valve. It is also characterized by the fact that it utilizes a relatively stationary piston 106, while the portion 108 forming the cylinder reciprocates. A further feature is that the piston is supported by the radial portions 103 of the body 96, which can be described as forming a web, and that the duct 121 for applying liquid pressure to chamber 118 extends thru this supporting web.

Operation of the complete system can be reviewed as follows:

Assuming that the operator wishes to operate certain ones of the valve units, to the exclusion of others, knobs 74 of devices A, B, C are set accordingly, and then the manual lever 49 of the hydraulic actuator is moved from its initial to full actuated position. Liquid under pressure is applied to the actuated valve to actuate them to open position and thus permitting flow of liquid from the particular tank or tank compartments with which the actuated units are associated. Assuming that all of the valve units of the system are not being actuated simultaneously, a bypassing of a certain amount of liquid from chamber 23 of the hydraulic actuator occurs back into the auxiliary liquid chamber. It can be explained at this point that the liquid to be used in my system can be conveniently ordinary lubricating oil of proper viscosity. Assuming that lever 49 remains in actuated position for an appreciable time, a small amount of liquid leakage from the system will not permit the actuated valves to close, as the liquid pressure is maintained by the secondary piston 34. When lever 49 is moved from its actuated to its initial position, piston 22 of the actuator is permitted to return to its normal retracted position under the urge of spring 32, and the actuated valve units returned to closed position under the urge of their respective compression springs 116. Thus as previously explained any one of all of the valve units can be separately actuated to the exclusion of the others, all of the valve units can be actuated simultaneously, or any two or more valve units can be operated simultaneously in groups to the exclusion of others.

With respect to the liquid pressure operated ignition switch 16, this device is shown connected to the hydraulic system by pipe 131, which leads from this device to the pipe connection 24 between the hydraulic actuator 10 and the selective distributing means 11. Thus during an actuation liquid pressure is applied to device 16 to interrupt the ignition circuit of the truck motor, thus minimizing fire hazard.

I claim:

1. In a hydraulic valve system, a plurality of valve units each adapted to be operated by application of liquid pressure, a mechanical operating member movable between two limiting positions, liquid pressure means associated with said valve units and said operating member, said liquid pressure means being operative to hydraulically actuate one or all of said valve units upon movement of said member from one of said limiting positions to the other.

2. In a hydraulic valve system, a plurality of separate valve units each normally biased towards closed position, each of said units being characterized by the fact that application of a definite quantity of liquid under pressure to the same will effect complete opening thereof, a movable mechanical operating member, and hydraulic pressure means actuated by movement of said member and serving to supply either a quantity of liquid under pressure to one unit to open the same to the exclusion of the other units, or a greater quantity of liquid to a plurality of said units to effect simultaneously opening thereof, for the same increment of movement of the operating member.

3. In a hydraulic valve system, a plurality of individual valve units, each of said units being normally biased toward closed position and being characterized by the fact that a definite quantity of liquid under pressure must be introduced into the same to effect complete opening thereof, a movable mechanical operating member, hydraulic pressure means actuated by movement of said member, and distribution control means for establishing communication between one of said units and said hydraulic pressure means to the exclusion of the other units or for establishing simultaneous communication between a plurality of said units and said hydraulic pressure means, said hydraulic pressure means being characterized by the inclusion of means for causing application of a certain quantity of liquid under pressure to one of said valve units to the exclusion of the others, or for causing application of a greater quantity of liquid under pressure to a plurality of said units to effect simultaneous operation of the same, according to the setting of said distribution control means, for the same increment of movement of the operating member.

4. In a system of the character described, a plurality of individual valve units normally biased toward closed positions, each of said units being adapted to be actuated to open position by application of liquid under pressure, a hydraulic pressure actuator having a plunger movable between release and actuated positions, hydraulic connections between said actuator and said valve units, means for interrupting communication between certain of said units and said actuator, said plunger having a maximum volumetric displacement sufficient to effect actuation of all of said valve units simultaneously upon movement of said plunger from said release to said actuated position, and means for enabling complete movement of said plunger from said released to said actuated positions to operate less than all of said valve units when communication to certain of said units is interrupted.

5. In a system of the character described, a plurality of valve units each normally biased toward closed position and adapted to be actuated to open position by application of liquid under pressure to the same, a hydraulic pressure actuator including a plunger movable between definite released and actuated positions and a cylinder in which the plunger reciprocates to displace liquid, a liquid reservoir in communication with said cylinder only when said plunger is in released position, hydraulic connections between said cylinder and said individual valve units, said plunger having a maximum volumetric displacement sufficient to effect actuation of all of said valve units simultaneously upon movement of said plunger from released to actuated position, means for interrupting communication between certain of said units and said cylinder at the will of the operator, and means for bypassing liquid under pressure from said cylinder back into said reservoir to permit full movement of the plunger from released to actuated position in operating less than all of said units, said last means being operative when the pressure in the cylinder exceeds a predetermined value in excess of that required to effect operation of a valve unit.

6. In a system of the character described, a hydraulic actuator for operating a variable number of fluid pressure responsive valve units, said actuator comprising a main piston or plunger, a casing forming a fluid pressure chamber with respect to one side of the plunger, a cylinder formed upon the main piston, a secondary piston disposed within said cylinder, means for biasing said secondary piston toward the chamber thereby forming a resilient wall for the chamber, and means controlled by movement of said secondary piston for exhausting liquid under pressure from the chamber when the liquid pressure within the chamber exceeds a certain predetermined value.

7. In a system of the character described, a plurality of tank valve units, each of said units being adapted to be operated by application of liquid pressure, liquid pressure means, a hydraulic connection between said liquid pressure means and said valve units, and selective control means associated with said hydraulic connections, said selective control means including means for permitting application of liquid under pressure to any one of said valve units separately or to all of said valve units simultaneously at the will of the operator, and means for venting liquid from a valve unit not selected for operation.

8. In a valve system of the character described, a plurality of tank valve units each adapted to be operated by application of fluid pressure, fluid pressure means, fluid connections between said fluid pressure means and said valve units, and selective control means associated with said fluid connection, said selective control means including means for permitting application of fluid pressure to any one of said valve units separately or to all of said valve units simultaneously or to any of said valve units in groups to the exclusion of one or more other units, at the will of the operator.

9. In a valve system of the character described, a plurality of tank valve units each adapted to be operated by application of fluid pressure, fluid pressure means, fluid connections between said fluid pressure means and said valve units, and selective control means associated with said fluid connections, said control means including a number of manual control members which is less than the number of valve units in the system, the setting of said control members enabling application of fluid pressure to any one of said valve units separately to the exclusion of the others, application of fluid pressure to all of said units simultaneously, or application of fluid pressure to any of said valve units in groups to the exclusion of one or more other units, at the will of the operator.

10. In a system of the character described, a source of hydraulic pressure, more than two valve units each adapted to be operated by application of fluid pressure, separate pipe connections to said units, and selective distribution means interposed between said source and said pipe connections, said means including two valve members each having at least three operating positions, in one of which fluid pressure from said source can be applied to two pipe connections, in another of which fluid pressure can be supplied to only one of the two pipe connections and in the third of which application of fluid pressure is interrupted to both of said two pipe connections.

11. In a system of the character described, a source of fluid pressure, three valve units each adapted to be operated by application of fluid pressure and identified for example by numbers 1 to 3 inclusive, separate pipe connections to said units similarly identified by numbers 1 to 3 inclusive, and selective distributing means interposed between said source and said pipe connections, said means including two valve members each having a plurality of operating positions, the first valve member having an off position in which application of fluid pressure to pipe connections 1 and 2 is interrupted and in which both these pipe connections are vented, a number 2 position in which fluid pressure is applied to pipe connection number 2 and in which pipe connection number 1 is vented, a 1—2 position in which fluid pressure is applied to both pipes 1 and 2, and a number 1 position in which fluid pressure is applied to pipe connection 1 and in which pipe connection 2 is vented, said second operating member having an off position in which application of fluid pressure to pipe connection 3 is interrupted, and a number 3 position in which fluid pressure is applied to pipe connection number 3, whereby when said second operating member is in said off position, valve unit 1 can be operated to the exclusion of the others, or valve unit number 3 operated to the exclusion of the others, or valve units 1 and 2 actuated to the exclusion of valve unit 3, and whereby when said second operating member is in said number 3 position, valve unit 3 can be operated to the exclusion of the others, or units 1 and 3 operated to the exclusion of valve unit 2, or valve units 2 and 3 operated to the exclusion of unit 1, or all valve units operated simultaneously.

12. In a system of the character described, a source of fluid pressure, four valve units each adapted to be operated by application of fluid pressure and identified for example by numbers 1 to 4 inclusive, separate pipe connections to said units similarly identified by numbers 1 to 4 inclusive, and selective distributing means interposed between said source and said pipe connections, said means including two valve members each having a plurality of operating positions, the first valve member having an off position in which application of fluid pressure from said source to pipe connections 1 and 2 is interrupted and in which both these pipe connections are vented, a number 2 position in which fluid pressure is applied to pipe connection 2 and in which pipe connection 1 is vented, a 1—2 position in which fluid pressure is applied to both pipe connections 1 and 2, and a number 1 position in which fluid pressure is applied to pipe connection 1 and in which pipe connection 2 is vented, said second operating member having an off position in which application of fluid pressure to pipe connections 3 and 4 is interrupted and in which both these pipe connections are vented, a number 4 position in which fluid pressure can be applied to pipe connection 4 and in which pipe connection 3 is vented, a 3—4 position in which pressure can be applied to both pipe connections 3 and 4, and a number 3 position in which fluid pressure can be applied to pipe connection 3 and in which pipe connection 4 is vented, whereby upon positioning said valve members to different positions, any one of said valve units can be operated to the exclusion of the other, any two valve units can be operated to the exclusion of the others, any three units operated to the exclusion of the other, or all units can be operated simultaneously.

13. In a hydraulic valve system, a fluid pressure responsive valve unit, means forming a fluid pressure chamber, a member movable between actuated and release positions and adapted to effect a volumetric displacement of fluid from said chamber in excess of that required to operate said unit, there being a fluid connection between said chamber and said valve unit, an auxiliary fluid reservoir, means for automatically bypassing to said reservoir that portion of the fluid displaced by movement of said member to actuated position, in excess of that required to operate said valve unit, and means for automatically maintaining fluid pressure within said chamber while said member is in actuated position, to compensate for fluid leakage.

14. In a system of the character described, a hydraulic actuator for operating a variable number of fluid pressure responsive valve units, said actuator comprising a main piston or plunger, a casing forming a fluid pressure chamber with respect to one side of the plunger, a cylinder formed on the main piston, a secondary piston disposed within said cylinder, spring means for biasing said secondary piston toward the chamber thereby forming a resilient wall for the chamber, means controlled by movement of said secondary piston for exhausting liquid under pressure from said chamber when the liquid pressure within the chamber exceeds a certain predetermined value, an auxiliary reservoir associated with said casing, and a check valve for controlling communication between said chamber and said reservoir, said check valve serving to permit flow of liquid from said auxiliary reservoir to said chamber during movement of said piston toward retracted position under the urge of said spring means.

15. In a hydraulic valve system, a plurality of separate valve units each normally biased towards closed position, each of said units being characterized by the fact that application of a definite quantity of liquid under pressure to the same will effect complete opening thereof, a movable mechanical operating member, and liquid displacement means actuated by movement of said member serving to supply either a quantity of liquid under pressure to one unit to open the same, or a greater quantity of liquid to a plurality of said units to effect simultaneous opening thereof, for the same increment of movement of the operating member between released and actuated positions, said means including provision for additional displacement of liquid while said operating member is retained in its actuated position to compensate for leakage, without permitting closing movement of the valve unit or units actuated.

16. In a system of the character described, a plurality of individual valve units normally biased toward closed positions, each of said units being adapted to be actuated to open position by application of liquid under pressure, a hydraulic pressure actuator having a plunger movable between release and actuated positions, hydraulic connections between said actuator and said valve units, means for interrupting communication between certain of said units and said actuator, said plunger having a maximum volumetric displacement in excess of that required to effect actuation of all of said valve units simultaneously upon movement of said plunger from said release to said actuated position, means for enabling complete movement of said plunger from said release to said actuated position to operate less than all of said valve units when communication to certain of said units is interrupted, and auxiliary liquid displacement means serving to maintain liquid supplied to said units under pressure while said plunger is retained in actuated position, to compensate for leakage, irrespective of the number of units actuated.

17. In a system of the character described, a plurality of valve units each normally biased toward closed position and adapted to be actuated to open position by application of liquid under pressure to the same, hydraulic pressure actuator including a plunger movable between definite release and actuated positions and a cylinder in which the plunger reciprocates to displace liquid, a liquid reservoir serving to prime said cylinder, hydraulic connections between said cylinder and said individual valve units, said plunger having a maximum volumetric displacement sufficient to effect actuation of all of said valve units simultaneously upon movement of said plunger from release to actuated position, means for interrupting communication between certain of said units and said cylinder at the will of the operator, said last means serving to establish a liquid connection between the reservoir and those units with which communication with the cylinder is interrupted, and means for bypassing liquid under pressure from said cylinder back into said reservoir to permit full movement of the plunger from release to actuated position in operating less than all of said units, said last means being operative when the pressure in the cylinder exceeds a predetermined value in excess of that required to effect operation of a valve unit.

18. In a system of the character described, a hydraulic actuator for operating a variable number of fluid pressure responsive valve units, said actuator comprising a plunger, a casing forming a fluid pressure chamber with respect to one side of the plunger, an auxiliary reservoir adapted to be placed in unrestricted communication with said chamber when said plunger is retracted with respect to said chamber, and additional means for bypassing liquid from said chamber to said auxiliary reservoir when the pressure in said chamber exceeds a predetermined value.

19. In a system of the character described, a plunger, a casing forming a fluid chamber with respect to said plunger, spring means for urging said plunger toward retracted position with respect to said chamber, an operating member movable between definite actuated and released limiting positions, means forming a mechanical connection between said member and said plunger whereby movement of said member in one direction serves to force the plunger inwardly with respect to said chamber against the pressure of said spring means, a fluid operated valve unit having hydraulic connection with said chamber, an auxiliary reservoir associated with said chamber, and a check valve for controlling communication between said chamber and said reservoir, said check valve serving to permit gravity flow of liquid from said auxiliary reservoir to said chamber during movement of said plunger toward retracted position under the urge of said spring means.

20. In a system of the character described, a liquid pressure responsive valve unit, said unit being biased toward closed position and being movable to a definite open position upon application of a predetermined quantity of liquid under pressure sufficient to overcome said bias, means forming a liquid pressure chamber having a liquid connection with said unit, a member movable between definite actuated and released positions and adapted during such movement to effect a volumetric displacement of liquid from said chamber in excess of that required to operate said unit, an auxiliary liquid reservoir, and means for automatically bypassing to said auxiliary reservoir that portion of the liquid displaced by movement of said member to actuated position, in excess of that required to operate said valve unit, said last means being operative when the liquid pressure applied to said unit substantially exceeds the pressure required to overcome said bias.

21. In a hydraulic valve system, a plurality of individual valve units, each of said units being normally biased toward closed position and being characterized by the fact that a definite quantity of liquid under pressure must be introduced into the same to effect complete opening thereof, hydraulic pressure means, and distribution control means for establishing communication between one of said units and said hydraulic pressure means to the exclusion of the other units or for establishing simultaneous communication between a plurality of said units and said hydraulic pressure means, said distribution control means also serving to automatically vent liquid from any and all valve units not selected for operation.

22. In a hydraulic valve system, a plurality of individual valve units, each of said units being normally biased toward closed position and being characterized by the fact that a definite quantity of liquid under pressure must be introduced into the same to effect complete opening thereof, hydraulic pressure means, distribution control means for establishing communication between one of said units and said hydraulic pressure means to the exclusion of the other units or for establishing simultaneous communication between a plurality of said units and said hydraulic pressure means, said distribution control means also serving to automatically vent liquid from any and all valve units not selected for operation, a liquid reservoir for supplying liquid to said hydraulic pressure means and serving to receive liquid vented by said distribution control means, and means for bypassing liquid under pressure from said hydraulic pressure means to said reservoir, said last means being operative when the pressure from said hydraulic pressure means exceeds a predetermined value in excess of that required to effect operation of a valve unit.

23. In a system of the character described, a liquid pressure responsive valve unit, said unit being biased toward closed position and being movable to a definite open position upon application of a predetermined quantity of liquid under pressure sufficient to overcome said bias, means forming a liquid pressure chamber having a liquid connection with said unit, a plunger movable between actuated and released positions and adapted during such movement to effect a volumetric displacement of liquid from said chamber, an auxiliary liquid reservoir, a duct establishing substantially unrestricted gravity communication between the reservoir and the upper part of said chamber when the plunger is in released position and being out of communication when the plunger is in actuated position, an additional duct communicating between the upper portion of said chamber and said reservoir, and a fluid-operated check valve controlling said last duct and closing against liquid flow from said chamber to said reservoir.

24. In a hydraulic valve system, a liquid pressure responsive valve unit, means forming a liquid pressure chamber, a plunger movable between actuated and released positions and adapted to effect a volumetric displacement of liquid from said chamber in excess of that required to operate said unit, there being a fluid connection between said chamber and said valve unit, an auxiliary liquid reservoir, and means carried by the plunger for automatically bypassing to said reservoir that portion of the liquid displaced by movement of said member to actuated position, in excess of that required to operate said valve unit.

ALBERT E. JURS.